June 18, 1957 W. KNOLLE 2,796,140
POWERED TRACTOR WITH FRONT AND REAR WHEEL STEERING CONTROLS
Filed May 16, 1952 5 Sheets-Sheet 1

INVENTOR
WILHELM KNOLLE
BY K. A. Mayr
ATTORNEY.

INVENTOR
WILHELM KNOLLE
BY K. A. Meyer
ATTORNEY

June 18, 1957 W. KNOLLE 2,796,140
POWERED TRACTOR WITH FRONT AND REAR WHEEL STEERING CONTROLS
Filed May 16, 1952 5 Sheets-Sheet 3
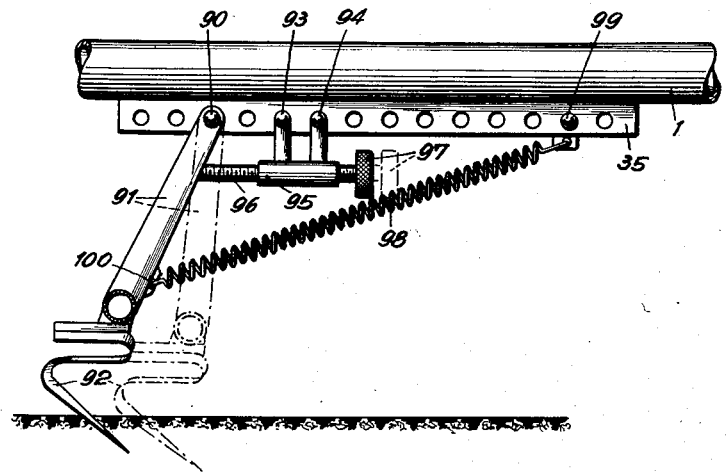
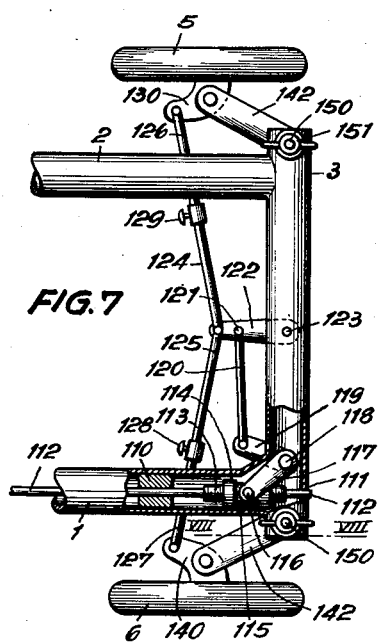
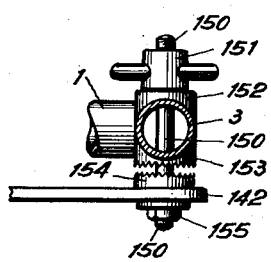
INVENTOR
WILHELM KNOLLE
BY K. B. Mayr
ATTORNEY.

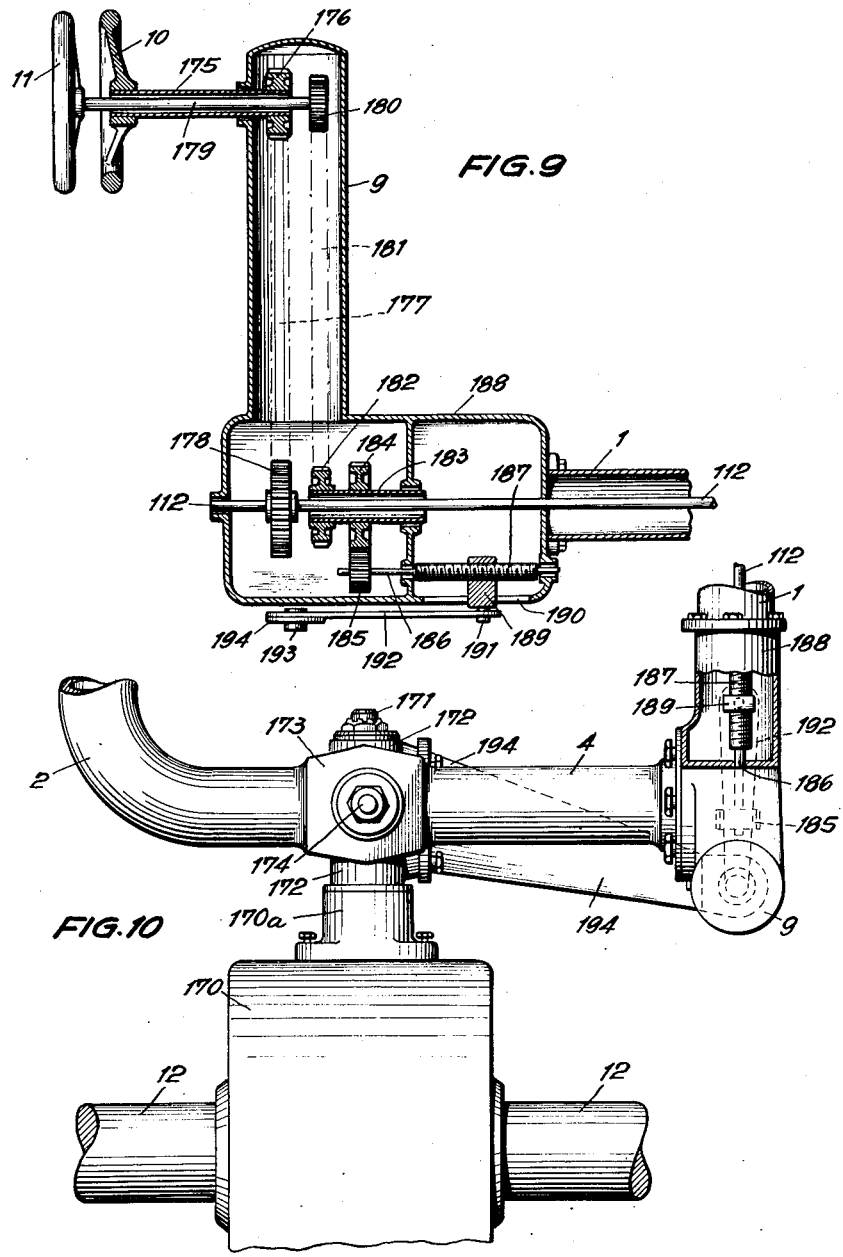

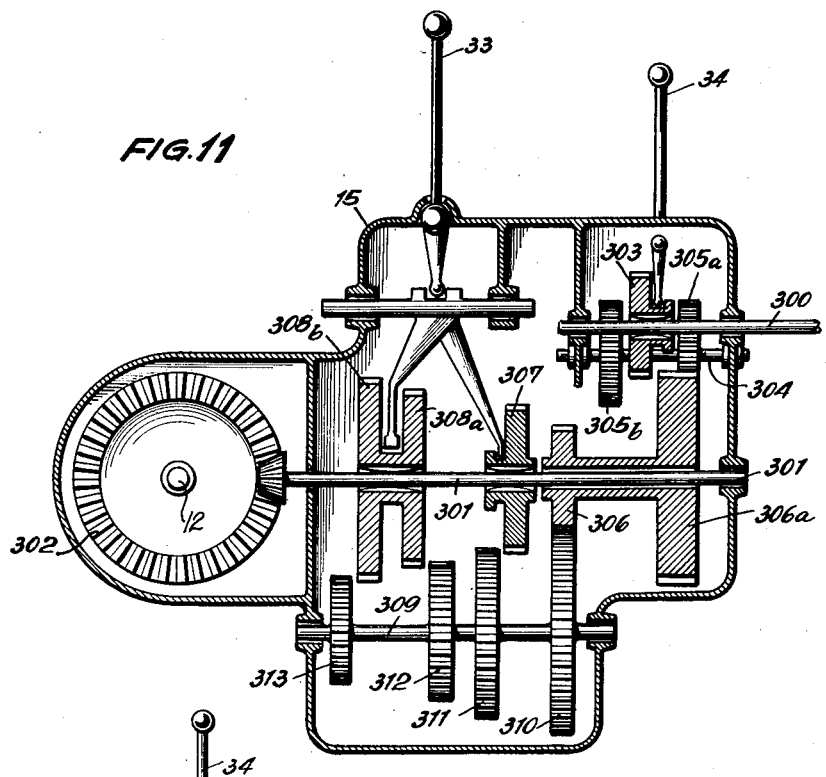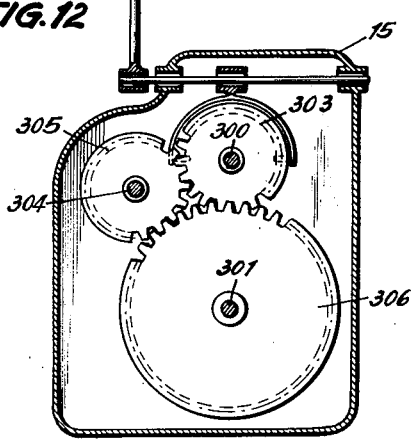

United States Patent Office 2,796,140
Patented June 18, 1957

2,796,140

POWERED TRACTOR WITH FRONT AND REAR WHEEL STEERING CONTROLS

Wilhelm Knolle, Heidelberg, Germany, assignor to Heinrich Lanz Aktiengesellschaft, Mannheim, Germany, a body corporate of Germany Application May 16, 1952, Serial No. 288,189

Claims priority, application Germany May 26, 1951

9 Claims. (Cl. 180—12)

This invention relates to an auto-motive working device and more precisely to an auto-motive implement-bearing vehicle for receiving and operating tools which is more particularly intended for receiving and operating groups of agricultural tools.

It is an object of the present invention to provide a simple device of the kind described, which is suitable for rough ground and in which all wheels are in permanent contact with the ground.

It is also an object of the invention to provide a device of the described kind in which the front and rear wheels are capable of being adjusted independently of each other in relation to the longitudinal direction of the device in order thereby to prevent slipping on sloping ground, or in which the running direction of the front wheels may be displaced laterally in relation to the running direction of the rear wheels.

Furthermore it is an object of the invention so to construct the working device that the operation of the implements to be applied thereto may be observed unobstructedly from the driver's seat. A still further object is to permit these working implements to be largely controlled from the driver's seat.

Yet another object of the invention is to make the working device also available as a means of transport adapted equally to be driven in two opposite directions.

Figure 1:
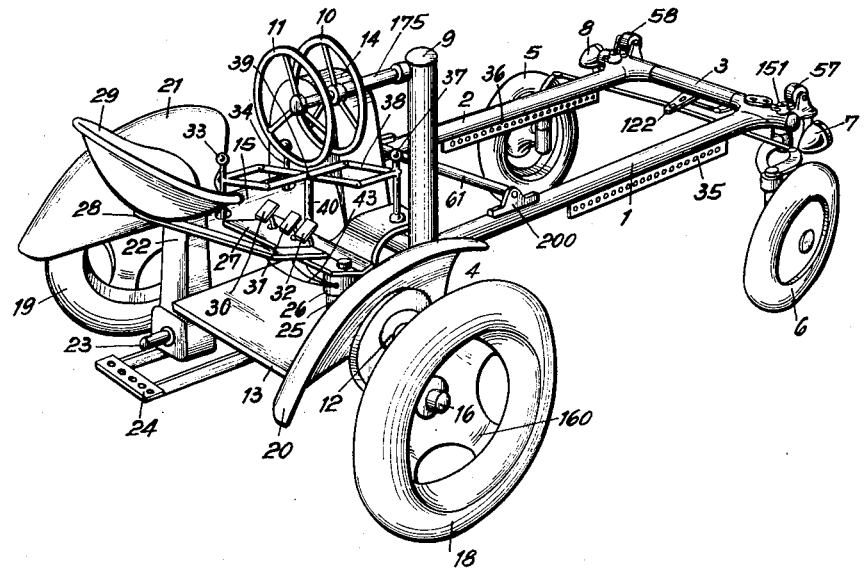

A still further object is to render the width of the track adjustable, this being desirable under the special conditions of agriculture. Further objects and features of the invention will appear from the following description with reference to the accompanying drawings, in which:

Fig. 1 is a perspective general view seen at an angle from the rearward end.

Figure 2:
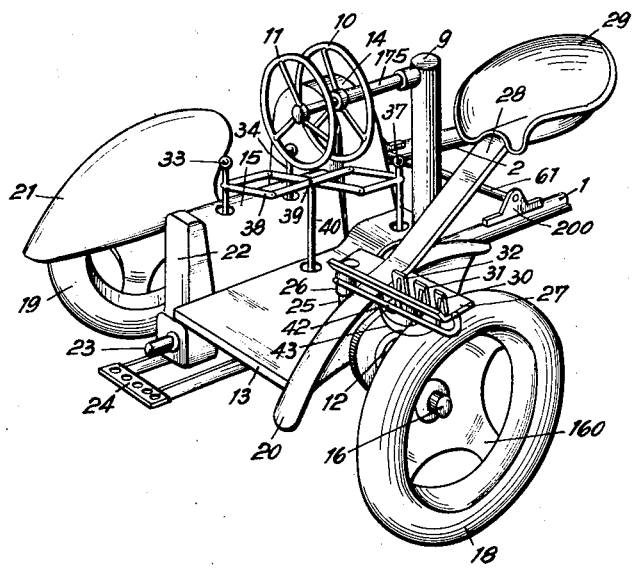
Figure 3:
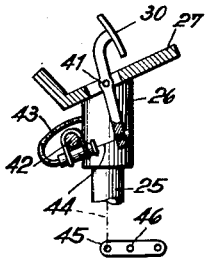
Figure 4:
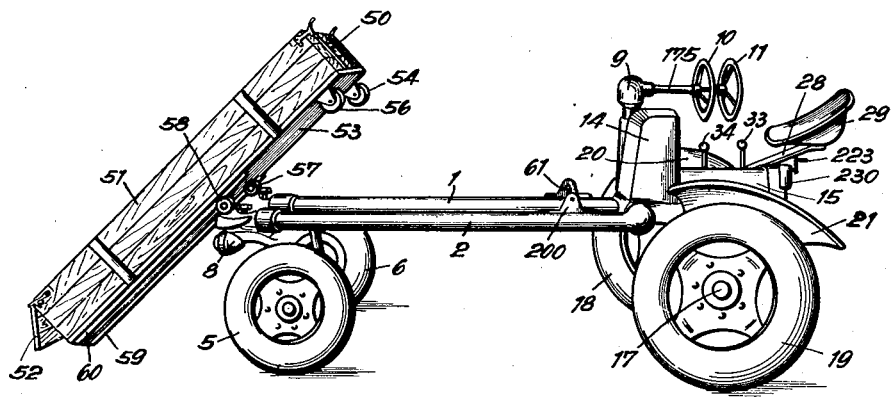
Figure 5:
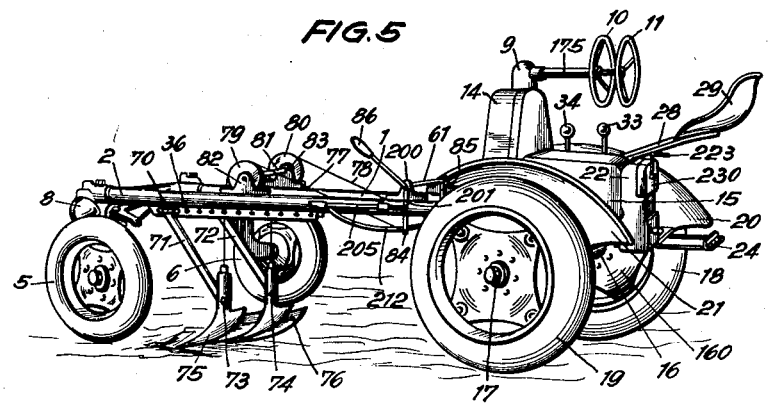

Fig. 2 is a perspective view of the rear portion of the device when adjusted for reverse movement, Fig. 3 is a diagrammatic view showing the connection of a foot pedal to the elements connected thereto, drawn as a section through the pedal support of Fig. 2, Fig. 4 is a perspective side view of the vehicle when equipped with a loading platform, Fig. 5 is a perspective side view showing the vehicle equipped with two ridging ploughs, Fig. 6 is a side elevation showing details of an implement suspension, Figs. 7 and 8 are respectively a plan view and a vertical section on the line VIII—VIII of Fig. 7 showing details of the front wheel suspension, Figs. 9 and 10 are respectively an axial section through the steering column and the longitudinal beam and an elevation with parts broken away, showing details of the adjustment of the rear wheel axle, Figs. 11 and 12 are sectional elevations respectively in parallel and at right angles to the shafts, showing details of the drive.

Referring now to the drawings and more particularly to Fig. 1, the working device as illustrated is so constructed as to only require one person for its operation, the device also having the advantage of being short and therefore of great mobility, the attachment points for the working implements being so located as to be readily observed.

The device as illustrated comprises a quadrangular frame formed by two tubular longitudinal beams 1 and 2 and two tubular cross beams 3 and 4. These beams 1, 2, 3 and 4 jointly form a rigid horizontally disposed rectangle with a large internal aperture. At its front end the frame is supported by two ground wheels 5 and 6; the manner in which these ground wheels are steered will be explained further below. The frame also carries, for example at its front end, headlamps 7 and 8. At the junction point between the longitudinal beam 1 and the crossbeam 4 a steering column 9 with two steering wheels 10 and 11 is provided.

In a manner to be described more in detail further below, the driven axle 12 is coupled with the crossbeam 4 of the frame, this driven axle carrying the platform 13, a motor or engine 14, and a gear box 15. The axial pins 16 and 17 (see Fig. 4) of the driven wheels 18 and 19 respectively are disposed lower than the driven axle 12 in order to obtain in this manner a greater ground clearance of the device. The driven axle may in a known manner be composed of two differential shafts with differential gearings. The two driven wheels 18 and 19 are covered at the top by mudguards 20 and 21. Mounted on the gearbox 15 is a covering 22 within which a power transmission to a power shaft 23 is arranged, this transmission consisting for example of a chain. The power shaft 23 may if desired be extended forwardly in the direction towards the frame 1, 2, 3, 4. Below the power shaft an attachment rail 24 is provided. The driver's seat and the steering and control elements are largely concentrated above the platform 13. In the illustrated embodiment, which may be equally well operated in either direction of travel, the platform 13 carries, through the medium of a column 25, a rotatable knob 26 to which a horizontal bracket arm 27 is secured. This horizontal arm carries the seat 29 through a support 28, and in addition pedals 30, 31 and 32 are provided on this arm, the pedal 30, for example, serving as gas pedal and the pedals 31 and 32 serving as brake pedals, the two brake pedals provided being respectively associated with the driven wheels 18 and 19. If, for example, the driven wheel 18 is braked by means of brake pedal 32, all the driving power passes through the differential gear to the driven wheel 19 thus turning the vehicle about the driven wheel 18, whereby an extraordinarily small turning radius is obtained. Turning in the opposite direction is produced by braking the driven wheel 19. When both brake pedals are pressed, the vehicle is wholly braked. Laterally of the seat the gear-change lever 33 is arranged and somewhat more to the front a reversing lever 34 is provided for the changeover for forward and reverse travel.

Under the longitudinal beams 1 and 2 there are U-profile bars 35 and 36 which are provided with horizontal apertures, and to which working implements may be attached.

Fig. 2 shows the rear portion of the vehicle shown in Fig. 1 with the seat changed over so as to be ready for reverse travel. In this condition the seat 29 is located by the side of the steering column 9 so that in order to operate the steering wheels 10 and 11 the driver is forced to reach with one arm over the steering column 9. The bracket 27 with the pedals is tilted to lie over the mudguard 20. An auxiliary gear change lever 37, mounted on a raised portion of the platform 13 and arranged within the reach of the driver's right arm, is coupled with the gear change lever 33 through a pantograph device 38 the fixed pivot 39 of which is supported through the medium of a rod 40 from the platform 13.

Fig. 3 indicates the manner in which the pedals may be coupled with the actuated means such as gas levers and brakes. The bracket 27 carries through a fixed pivot point 41, the pedals, e. g. the gas pedal which, as shown in Fig. 3, comprises a two-sided lever with a foot rest. The rotatable knob 26 which carries the bracket 27, carries a horizontal bar 42 on which Bowden cables 43 are secured, only one of these Bowden cables being shown in Fig. 3. The wire core 44 of this Bowden cable is connected with the free end of the pedal 30 whilst the sheath rests against the bar 42. The Bowden cable is conducted into the rotary knob 26 whilst the wire core 44 passes through the column 25 and ends at a lever 45 which is adapted to be tilted about a pivot point 46. The movements of the free end of this lever 45 may then be utilised for operating the gas lever proper, or in the case of the brake pedal for actuating the brakes. Turning the knob 26 through 180° is clearly permissible when Bowden cables are used.

Fig. 4 shows the embodiment as seen from the left-hand side when equipped with a loading platform 53 which, in the usual manner, is equipped with side walls 50, 51, 52 adapted to be tilted up or down, and which is provided at one of its ends with two rollers 54 and 56. On the other hand a frame is equipped at its front ends, that is to say within the range of the cross beam 3, with two rollers 57 and 58. The rollers 57 and 58 are guided in U-section rails 59 and 60 on the lower side of the platform 53 while the rollers 54 and 56 are adapted to run along the longitudinal beams 1 and 2. When the lower end of the platform is raised, the rollers 54 and 56 get in contact with the longitudinal beams 1 and 2 of the platform, which may then be slid on to the frame. When, on the other hand, the platform is pulled forwardly on the frame, it will tip over forwardly as soon as the centre of gravity passes beyond the rollers 57 and 58. It will thereby automatically unload itself and may be detached from the frame by tipping over its upper end. When travelling with the platform loaded, it will in many cases be advantageous for the seat to be moved into the position shown in Fig. 2 and to travel in the reverse direction so that the driver may not be impeded in his view by the load. Hooks, acting for example upon the bars 61, may be provided for securing the platform on the carriage.

Fig. 5 shows by way of example, the arrangement of two ridge-forming ploughs on the device. The perforated U-section rails (of which only one rail 36 is visible in Fig. 5) carry a bar (not shown), secured for example by a strap 70, on which the levers 71 and 72 are tiltably mounted by means of sleeves. The ridge-forming ploughs 75 and 76 are attached to the ends of these levers at 73 and 74. These ridge-forming ploughs are supported by ropes 77 and 78 which pass over rollers 79 and 80, respectively, on the shaft 81. The latter turns in bearing brackets 82 and 83 which are detachably secured in any desired manner on the longitudinal beams 1 and 2 respectively. The wire ropes 77 and 78 lead to the ends of levers 84 and 85, respectively, which are rigidly connected with the above-mentioned rotatable rod 61. The latter may for example be tilted manually, by means of a lever 86, in order to raise or lower the ridge-forming ploughs 75 and 76 as required. A further possibility of actuation will be described further below.

Fig. 6 shows details of a way in which working implements may be secured, the front wheel (crossbeam 3) being located at the right-hand side. The bar 35 secured on the longitudinal beam 1 carries, by means of a pin 90, a lever 91 on which the working implement 92 is secured. Two further pins 93 and 94 carry a screw-threaded sleeve 95 in which a screw spindle 96 is adapted to be screwed forwardly or backwardly by means of a handle 97. A spring 98 is secured on the one hand to the pin 99 in the U-section bar 35 and on the other hand to a lug 100 near the lower end of the lever 91 so as to pull this lever forwardly against the end of the screw spindle 96. In this manner the position of the screw spindle 96 in the sleeve 95 determines the depth of penetration of the working implement 92 whilst the latter may, when striking an obstacle yield rearwardly, thereby tensioning the spring 98.

An advantageous manner of suspension for the front wheels 5 and 6 will now be explained more in detail with reference to Figs. 7 and 8, the former of which is an elevation whilst the latter is a fragmentary section on the line VIII—VIII of Fig. 7. As shown in Fig. 7 the longitudinal beam 1 encloses a rod 112 supported at 110 and 111 and provided with a screw-threaded portion 113 on which a nut 114 having a slot 115 at its periphery is mounted, this nut being axially displaceable but prevented from rotation. A pin 116 provided on a lever 117 engages the slot 115. Lever 117 is carried by a pin 118 and is secured to the latter against relative rotation. The pin 118 is rotatably mounted in the crossbeam 3 and carries on its lower side a further lever 119, which is likewise secured against rotation relative to the pin 118, so that the levers 117 and 119 jointly form a bell-crank lever. Attached to the free end of the lever 119 is a link 120 which is pivotally connected at 121 with a lever 122 adapted to pivot about the point 123 on the cross bar 3, and pivoted to the free end of the lever 122 are two tubes 124 and 125. Links 126 and 127 are mounted in these tubes and secured by set screws 128 and 129 against longitudinal movement therein. The links 126 and 127 are pivoted to the stub axles 130 and 140 which are formed as bell-crank levers and on which the wheels 5 and 6 are mounted. The stub axles 130 and 140 are supported through levers 141 and 142 respectively, the importance of which levers will be described further on with reference to Fig. 8.

When, by rotating the rod 112 or the screw-threaded portion 113, the nut 114 is displaced, for example towards the front, the bell-crank lever 117, 119 will tilt towards the right, taking with it the lever 122. Thereby, the links 126 and 127 will also be moved to the right, and the resulting movement of the stub axles 130 and 140 tilts the wheels 5 and 6 thus causing the vehicle to describe a left-hand curve.

The device illustrated in Fig. 8 serves for varying the width of track of the front wheels in order to permit this width of track to be adapted, for example, to the spacing of the rows of plants on a field. For this purpose a bolt 150 passes through each end of the cross-beam 3 similar to that shown in Fig. 8, the bolt having been rendered visible in the drawing by cutting off the end wall of the cross-beam 3. The arrangement at the left-hand end of the cross-beam 3 is of similar construction and therefore does not require separate description. The bolt 150 is provided at its upper end with a wing nut 151 which is supported on the cross-beam 3 with the interposition of a packing piece 152 the lower outline of which conforms to the shape of the cross-beam. A similar packing piece 153 is also provided at the lower side, the two packing pieces 152 and 153 being, for example, connected to the cross-beam by welding. The packing piece 153 is roughened at its lower surface and it is faced by a plate 154 roughened at its upper side with which the lever 142 is rigidly connected, a nut 155 being provided for securing the lever 142 with the plate 154 to prevent the same from falling off.

In the position shown in Fig. 8 the roughened sides of the parts 153 and 154 are out of contact with each other, thus permitting, after release of the screw 128 (Fig. 7), the arm 142 to be tilted and the width of track to be altered thereby. When the desired width of track has been adjusted, the wing nut 151 is tightened until the roughened faces of the parts 153 and 154 engage each other to lock the arm 142, whereafter the screw 128 is tightened in the new position in order to restore the steering connection in this manner. During the alteration of the width of track the frame is slightly lifted in order to detach the roughened faces of the parts 153 and 154 from each other, this being readily feasible since the illustrated tubular frame has but little weight.

The arrangement for adjusting the width of the driven track 18 and 19 may be similarly constructed, but in the illustrated embodiment a different arrangement is shown which, while not permitting the width of track to be adjusted continuously, is simpler in construction. As can be seen in Fig. 1, the supporting disc 160 of the wheel 18 is of considerably curved dish shape so that the point of attachment to the stub axle 16 is disposed outside the central plane of the wheel 18. When with such a construction the wheel 18 is detached from the stub axle 16, turned over and re-fitted on the stub axle in the opposite position, the distance of the running surface from the longitudinal median plane of the vehicle is reduced by twice the amount of the distance of the point of attachment from the plane of the wheel.

A feature of particular importance in the present invention is that of adaptability to the formation of the ground. Figs. 9 and 10 show the elements employed for this purpose in a vertical section (Fig. 9) and in an elevation with parts broken away (Fig. 10). It is desired, on the one hand, that in all circumstances all four wheels of the device shall be in contact with the ground at the same time, and on the other hand that the driven axle may be tilted in relation to the frame. The tilting of the driven axle in relation to the frame will generally not be utilised for the steering of the vehicle since this may be attained in a simpler manner by tilting the front wheels which are steered by stub axles. When, however, the vehicle is used for work e. g. on sloping ground, the heavy driven axle, which carries the driver, the motor or engine, and the gear, is apt to slip laterally. This risk may be counteracted by so altering the position of the driven axle in relation to the direction of travel as to cause the driven wheels to work at an angle up to the slope. Moreover one may for example, when working on plane ground, turn the driver's axle relative to the frame and then by the steering device adjust the front wheels into the direction of travel of the driven wheels. In this case the driven wheels will travel in a different track to the front wheels, which is of advantage for many kinds of work, for example in ploughing.

Figs. 9 and 10 show the right-hand longitudinal beam which with the rotatable rod 112, the rear cross-beam 4, the left-hand side beam 2, and the driven axle 12. This driven axle 12 carries a block-shaped member 170 to which a pin 171 is secured through the medium of an intermediate member 170a. The cross-beam 4 is tiltable about the said pin 171 so that when the driven shaft 12 is held in its position, the longitudinal beam 2, for example, may be raised (with the front wheel 5) and the longitudinal beam 1 (with the front wheel 6) lowered. This tilting will take place automatically under the influence of irregularities of the ground and therefore does not require further explanation.

The housing 172 which surrounds the pin 171 and is rotatable about the latter is pivotally connected with a further housing 173, through which the cross-beam 4 passes, and in which a vertical pin 174 is rotatably mounted, this pin 174 in its turn being rigidly secured to the housing 172. The tilting of the driven axle in relation to the frame (as a representative part the cross-beam 4 may be considered in the following) takes place about this pin 174 in the following manner.

While the steering wheel 10 acts through the tube 175, the sprocket 176, and thus through chain 177 and sprocket wheel 178, to move the rotatable rod 112, one may by means of the steering wheel 11, through the rod 179, the sprocket wheel 180, the chain 181, the sprocket wheel 182, the tube 183 rigidly connected with this sprocket wheel 182, the gear wheel 184 which is rigidly connected to the tube 183 and the pinion 185 with which the gear wheel 180 is in engagement, turn the rod 186 which is provided with a screw-threaded portion 187. As can be seen in Fig. 9, some of the parts mentioned are accommodated in the steering column 9 and others in a separate housing 188 provided at the junction point between the longitudinal beam 1 and the cross-beam 4. Mounted on the screw-threaded portion 187 of the screw-threaded portion 186 is a nut 189, which is prevented from rotation but left free to slide by engaging a slot 190 provided in the housing 188. The nut 189, which projects through the slot 190, carries through the medium of a pin 191, a lever 192, to which a further lever 194 is pivoted at 193, the lever 194 being rigidly mounted on the housing 172.

When the steering wheel 11 is turned, the nut 189 is, through the said parts 179, 180, 181, 182, 183, 184, 185, 186 and 187, displaced in the longitudinal direction of the beam 1, that is to say at right angles to the cross-beam 4. By means of the pin 191 the nut 189 moves the lever 192 and by means of a pin 193 tilts the lever 194, thereby tilting the housing 172 about the pin 174 and tilting the driven axle 12 in relation to the cross-beam 4. When, for example due to the greater weight of the driven shaft, the latter is held in its position, then obviously the frame will be tilted.

As has been mentioned more particularly with reference to Fig. 4, it is often advantageous to drive the device also in the reverse direction. With this object in view the gear drive may be so constructed as to permit the drive to work equally well in the forward and reverse directions. This possibility is explained more in detail with reference to Figs. 11 and 12, which illustrate the path of power transmission from the motor shaft 300 to the output shaft 301, which acts upon the differential gear 302.

Mounted on the motor shaft 300 is a slidable gear wheel 303 which is connected to the shaft 300 for common rotation. A countershaft 304 carries a twin gear 305a, 305b. Mounted on the output shaft 301 is a freely rotatable twin gear 306a, 306b, a slidable fixed gear 307, and a slidable fixed twin gear 308a, 308b, while an intermediate shaft 309 carries four fixed gears 310, 311, 312 and 313. Coupled with a slidable gear 303 is a reversing lever 34 while the gear change lever 33 is coupled with the slidable gears 307 and 308.

The illustrated position corresponds to idling. The engine drives, through the shaft 300, the gear 303 which is not in engagement with any other gear. If lever 34 is moved towards the left, as seen in Fig. 11, the gear 303 engages the gear 306a of the twin gear 306 and in this manner drives the gear 310 of the intermediate shaft 309. According as the gear change lever 33 is moved in one direction or the other, either the low speed drive 313—308b, or the medium speed drive 312—308a, or the high speed drive 311—307 is obtained. If on the other hand the lever 34 is tilted to the right in Fig. 11, gear 303 engages the left-hand gear 305a of the twin gear 305, whereupon the power transmission is effected from 303 through 305a, 305b, to 306, the direction of movement of gear 306 being thus reversed due to the interposition of the twin gear 305. Apart from this the operation is exactly the same as it was described hereinabove in connection with the direct transmission and power from gear 303 to gear 306 so that in this case three forward drives and three reverse drives of equal value are available.

The vehicle which is generally illustrated in Fig. 1, and details of which are shown in the other figures may carry the individual working implements such as a beet topper, haulm cutter, beet lifter, potato lifter, corn mower, grass mower, ploughs, cultivators, rakes, drill sowing machines, manure spreaders, sprinkler devices, etc., preferably on its frame. Attachment will in many cases be effected on the U-section bars 35 or 36. In most cases the implements will be disposed below the frame where they are readily observable by the driver. Mowing machines, top cutters, and beet toppers may also be arranged laterally and more particularly at the side at which the steering column 9 is located, that is to say at the right-hand side in the present example. Alternatively, however, such devices and for example also manure spreaders may be attached at the front to the cross bar 3. Drill type seed sowers will preferably be placed on the frame and the depositing tubes bent round the thin beams 1 and 2. Moreover agricultural implements may also be attached to the attachment bar 24. In this manner it is for example possible for a manure spreader to be mounted to the cross bar 3, as seed-sowing machine on the longitudinal beams 1 and 2, and a rake to be attached to the attachment bar 24. All those elements which require accurate steering are in this manner arranged within view of the driver. Similar principles are also applicable to other implements. The frame 1, 2, 3, 4 is advantageously arranged at least so high that its upper edge is located above the front wheels in order to permit free movement of the loading platform. Preferably, however, the frame is arranged even higher than this so as to permit the front wheel when steered at a relatively great angle, for example when steering by braking one of the driven wheels, to move below the frame.

It will be obvious to an expert skilled in the art relating to agricultural machinery, that numerous modifications may be made to the vehicle described without exceeding the scope of the present invention. For example the mechanical means provided in connection with the reversal of the direction of movement such as the Bowden cables 42, 43 and the pantograph device 38 may be replaced by electrical arrangements. Instead of the provision of U-section bars 35, 36, the attachment means for the working implements may be suspended over the beams and secured by screw connections.

I claim:

1. A tractor, particularly for agricultural purposes, comprising a horizontal, substantially rectangular frame adapted for mounting a loading platform and/or agricultural implements, front wheels swingably connected with the front end of said frame, a motorized shaft disposed outside of the rear end of said frame, rear wheels connected with said shaft, connecting means movably connecting the rear end of said frame with said shaft, said connecting means comprising a horizontal pin placed at a right angle with respect to said shaft for affording swinging of said frame about the horizontal axis of said pin, said connecting means comprising a vertical pin for affording swinging of said frame about the vertical axis of said vertical pin, a steering post disposed at the rear end of said frame, said frame including hollow members, steering means extending from said steering post to said front wheels and being disposed inside said hollow members, and additional steering means extending from said steering post to said connecting means for swinging said frame on said vertical pin, said additional steering means including screw and nut means and drive means for said screw means, said screw and nut means as well as said drive means being disposed inside said hollow members.

2. A tractor according to claim 1, at least one of said hollow members constituting a longitudinal beam of said frame, each of said steering means including a steering wheel, said steering wheels being coaxially supported by said post and the common rotation axis of said steering wheels being in a vertical plane including the longitudinal axis of said beam.

3. A tractor, particularly for agricultural purposes, comprising a horizontal, substantially flat, rectangular frame which is closed on all sides and adapted for mounting a loading platform and/or agricultural implements, front wheels swingably connected with the front end of said frame for swinging in a horizontal plane, an axle having wheels mounted thereon and being located in the rear of and pivotally connected with the rear end of said frame, a steering post mounted on the rear end of said frame and being forward of said axle, steering means extending substantially in the plane of said frame from said steering post to said front wheels, an engine supported by said axle and being connected therewith for driving said axle, and an operator's seat supported by said axle.

4. A tractor as defined in claim 3 in which said frame is made of tubes and in which said steering means include parts placed within said tubes.

5. A tractor as defined in claim 3 in which said frame is formed by two parallel longitudinal beams and two parallel transverse beams, one of said transverse beams rigidly connecting the front ends of said longitudinal beams and the other transverse beam rigidly connecting the rear ends of said longitudinal beams, said frame being completely open between said beams.

6. A tractor according to claim 5 in which said steering post is placed at the rear end of one of said longitudinal beams.

7. A tractor comprising a horizontal rectangular frame which is closed on all sides and adapted for mounting agricultural implements, front wheels located below and being swingably connected with the front end of said frame for swinging in a horizontal plane, a motorized axle having wheels mounted thereon and being located in the rear of and pivotally connected with the rear end of said frame, a steering post mounted on the rear end of said frame, steering means extending from said steering post to said front wheels, rollers mounted to and projecting upwardly from the front end of said frame, a loading platform adapted to ride on said rollers, and rollers mounted on and projecting downwardly from the rear portion of said platform and adapted to roll on said frame.

8. A tractor, particularly for agricultural purposes comprising a front and a rear unit and a pivotal connection between said units, said front unit including a horizontal rectangular frame which is closed on all sides and adapted for mounting a loading platform and/or agricultural implements, front wheels swingably connected with the front end of said frame for swinging in a horizontal plane, a steering post mounted on the rear end of said frame, and steering means extending from said steering post to said front wheels; said rear unit including a driving axle having wheels mounted thereon, an engine supported by said axle, a transmission interposed between said engine and said axle for driving the latter by said engine, and a driver's seat mounted on said axle.

9. A tractor, particularly for agricultural purposes comprising a front and a rear unit and a pivotal connection between said units, said front unit including a horizontal rectangular frame which is closed on all sides and adapted for mounting a loading platform and/or agricultural implements, front wheels swingably connected with the front end of said frame for swinging in a horizontal plane, a steering post mounted on the rear end of said frame, and steering means extending from said steering post to said front wheels; said rear unit including a driving axle having wheels mounted thereon, an engine supported by said axle, a transmission interposed between said engine and said axle for driving the latter by said engine, and a driver's seat mounted on said axle, said pivotal connection including a housing, a vertical pin extending from said housing through the rear end of said frame, a horizontal pin supported by said driving axle and extending through said housing, and means interconnecting said steering post and said housing for changing the horizontal angular position of said rear unit relatively to said front unit.

References Cited in the file of this patent

UNITED STATES PATENTS

| 1,048,770 | Walker | Dec. 31, 1912 |
| 1,104,294 | Erickson | July 21, 1914 |
| 1,214,264 | Barnhart | Jan. 30, 1917 |
| 1,405,159 | Polaski | Jan. 31, 1922 |
| 1,408,895 | Lamoreaux | Mar. 7, 1922 |

(Other references on following page)

UNITED STATES PATENTS

| | | |
|---|---|---|
| 1,415,356 | Jandasek | May 9, 1922 |
| 1,461,598 | Wylie et al. | July 10, 1923 |
| 1,563,863 | Joyner | Dec. 1, 1925 |
| 1,681,885 | Raab | Aug. 21, 1928 |
| 1,687,457 | Kreider | Oct. 9, 1928 |
| 1,760,749 | Gillespie | May 27, 1930 |
| 1,786,060 | Greaves et al. | Dec. 23, 1930 |
| 2,138,239 | Irgens | Nov. 29, 1938 |
| 2,323,817 | Lee | July 6, 1943 |
| 2,449,159 | Brown | Sept. 14, 1948 |
| 2,453,069 | Hutchings | Nov. 2, 1948 |
| 2,564,034 | Seeger | Aug. 14, 1951 |
| 2,580,480 | Strehlow | Jan. 1, 1952 |
| 2,616,348 | Ariens | Nov. 4, 1952 |
| 2,630,746 | Thompson | Mar. 10, 1953 |

FOREIGN PATENTS

| | | |
|---|---|---|
| 140,399 | Great Britain | Oct. 14, 1920 |
| 615,247 | Great Britain | Jan. 4, 1949 |